United States Patent [19]

Garbutt

[11] 4,163,010

[45] Jul. 31, 1979

[54] ISOLATION OF PROTEINACEOUS MATERIALS

[75] Inventor: John T. Garbutt, Muscatine, Iowa

[73] Assignee: Grain Processing Corporation, Muscatine, Iowa

[21] Appl. No.: 900,499

[22] Filed: Apr. 27, 1978

[51] Int. Cl.$^2$ .............................................. A23J 1/16
[52] U.S. Cl. ................................ 260/112 R; 426/656; 426/490; 260/112 G
[58] Field of Search .............................. 426/656, 490; 260/112 R, 112 G

[56] References Cited

U.S. PATENT DOCUMENTS

| | | | |
|---|---|---|---|
| 3,622,556 | 11/1971 | O'Connor | 426/656 X |
| 3,862,109 | 1/1975 | Mitsuda et al. | 426/565 X |
| 3,922,375 | 11/1975 | Dalan | 426/656 X |
| 3,947,598 | 3/1976 | Stenne | 426/656 X |
| 4,018,752 | 4/1977 | Buhler et al. | 426/656 X |
| 4,028,468 | 6/1977 | Hohner et al. | 426/656 X |

OTHER PUBLICATIONS

Christianson, D. D. et al., "Identification and Determination of Nonprotein Nitrogenous Substances in Corn Steep Liquor," J. Agr. Food Chem., 13, 1965, pp. 277-280.

Bell, P. M., "Acritical Study of Methods for Determination of Nonprotein Nitrogen," Anal. Biochem., 5, 1963, pp. 443-451.

*Primary Examiner*—Robert A. Yoncoskie
*Attorney, Agent, or Firm*—Neuman, Williams, Anderson & Olson

[57] ABSTRACT

Protein is recovered from corn steep liquor by a process which involves ultrafiltration and precipitation with an alkaline precipitating agent. The recovered protein is acid soluble making it useful in acidic foods.

6 Claims, No Drawings

ISOLATION OF PROTEINACEOUS MATERIALS

This invention relates to obtaining from corn steep liquor a protein product which has desirable properties for use as a foodstuff.

Corn steep liquor, which is the aqueous extract obtained when corn is soaked in water containing sulfur dioxide, is a by-product of the corn wet milling industry and contains about 45-50%, dry basis, soluble protein measured as Kjeldahl nitrogen. The corn steep liquor solids represent about 6% of the corn, about 450 million bushels, which is steeped annually in the United States. Thus, approximately 1500 million pounds of corn steep liquor solids and 750 million pounds of protein measured as Kjeldahl nitrogen are available in the United States every year. This is potentially a good source of protein for food use if protein of sufficient purity can be recovered.

It is known that a relatively large portion of the total nitrogen in the corn steep liquor solids is in the form of amino acids, peptides and volatile compounds, probably ammonia. Thus, while not all of the nitrogen in corn steep liquor solids is in protein form, there is a substantial amount of protein in such material. Although protein purification by such techniques as dialysis, ammonium sulfate precipitation, solvent precipitation, reverse osmosis or ultrafiltration are known, it has not been possible heretofore to obtain a suitable high protein product from corn steep liquor.

It is an object of this invention to provide a process for obtaining from corn steep liquor a protein product having sufficient purity that it can be used in food applications.

Another object of the invention is the recovery from corn steep liquor of a protein product by a process which does not significantly change the chemical properties of the corn steep liquor so that the liquor can be recovered and used.

A further object of the invention is to obtain from corn steep liquor a protein product having good whipping properties.

A still further object of the invention is to obtain from corn steep liquor a protein product having good solubility in acidic food preparations, such as citrus-type beverages.

Another object of the invention is to obtain from corn steep liquor a protein product that can be fortified nutritionally but retain the physical properties of the protein.

Another object of the invention is to obtain from corn steep liquor a protein product that is useful in cosmetic applications.

The basic process of this invention involves subjecting corn steep liquor to ultrafiltration and thereafter treating the retentate with an alkaline precipitating agent to effect precipitation of non-protein constituents. This combination of treatments results in a protein product of high purity which is water and acid soluble.

The known principle of ultrafiltration is to apply pressure to transfer water and relatively small molecules of solute through a semi-permeable membrane. This causes the transfer of water and selected materials from a more concentrated to a more dilute solution. Various types of membranes are available which will permit certain solute materials along with the solvent to pass through the membrane into the diffusate while other solute materials are retained thereby in the retentate. For use in accordance with this invention, a membrane is chosen which is capable of allowing naturally occurring salts, carbohydrates and materials of relatively small molecular size to rapidly pass into the diffusate. At the same time the membrane must be closed enough to retain the proteins of larger molecular size in the retentate. In general, any membrane which retains proteinaceous material, including polypeptides, can be used.

Suitable ultrafiltration equipment is commercially available from such manufacturers as the Dorr-Oliver Corporation, Abcor Inc., Romicon Inc. and Amicon Corporation. The choice of membrane is governed by the consideration that it retains as a retentate proteins while permitting materials of smaller molecular size to rapidly pass into the diffusate. Suitable representative membranes are Amicon PM-10, Amicon PM-30, Amicon PM-50, Abcor WRP, Dorr-Oliver Corporation XP-18, Romicon PM-10, Romicon PM-30 and XM-50.

A convenient technique for evaluating a membrane for its ability to separate protein from non-protein components of the corn steep liquor is to test the diffusate with trichloroacetic acid (TCA). Trichloroacetic acid will precipitate higher molecular weight protein. Thus, if the diffusate when tested with trichloroacetic acid shows a negative precipitate response, this is indicative of little or no protein passing through the membrane.

In carrying out the process of the invention according to a presently preferred embodiment, corn steep liquor at a pH of not above about 5 is filtered to remove traces of turbidity. More preferably, the corn steep liquor is polish filtered so as to produce as clear a filtrate as possible. The clear filtrate is then subjected to ultrafiltration. In carrying out the ultrafiltration, the pH of the corn steep liquor should be not substantially above 5 and the ultrafiltration should be carried out at a relatively high temperature and pressure to obtain maximum flux or filtration rates across the membrane. Generally, with laboratory scale ultrafiltration units such as an Amicon laboratory scale unit, the ultrafiltration can be carried out at pressures from 20 to 80 psi and at ambient temperatures and above. Higher temperatures are preferred for the ultrafiltration (Example 9, infra) and temperatures above about 55° C. up to about 90° C. are preferred. The protein content of the retentate is dependant on the amount of diffusate which is produced. If the ultrafiltration is carried out under conditions to yield a large volume of diffusate as compared with the retentate, the protein recovery will be lower. In general, it is preferred to conduct the ultrafiltration so as to produce from about 0.5 to 2.0 volumes and more preferably 0.9 to 1.0 volumes of diffusate based on the volume of corn steep liquor feed.

In the practice of this invention the corn steep liquor can, if desired, be washed or concentrated or both washed and concentrated during ultrafiltration. Washing is the admission of water to the system during ultrafiltration at a rate equal to the rate of removal of diffusate, thus maintaining a constant retentate volume. This causes smaller molecular-sized materials to pass into the diffusate and purify the proteins in the retentate. Concentration is achieved during the ultrafiltration procedure by simply permitting the retentate volume to decrease as permeable materials and water pass from the retentate to the diffusate without the admission of water. Washing the retained proteins with about 0.5 to 4.0 volumes of water is generally sufficient to obtain a high quality proteinaceous product upon subsequent drying. Concentration provides both purification and economies in processing. Concentration of up to three-fold or more may be practical.

The retentate is treated with an alkaline precipitating agent such as alkali metal salts and bases, including ammonium hydroxide, to give a pH of from about 5 to 9. Treatment with the alkaline precipitating agent causes a precipitate to form and the precipitated slurry is preferably heated to a temperature above about 75° C. to remove components which may precipitate on heating. This heating of the precipitated slurry insures that a heat stable non-hazy protein product is obtained. The slurry is then filtered or centrifuged and the filtrate can, if desired, then be dried by suitable known drying techniques to obtain the protein product in solid form. If desired, the retentate, prior to precipitation with the alkaline precipitating agent, may be treated with carbon to improve the color if the end use of the product dictates that a product of good color be employed. Generally speaking, carbon levels of 1 to 3% by weight based on the corn steep liquor solids, dry basis, markedly improve the product color.

The following examples are illustrative of the advantages of the present invention.

EXAMPLE 1

Corn steep liquor (CSL) was diluted with an equal volume of water and filtered. Two liters of the clear filtrate at pH 4.2 were placed in an Amicon TC-1 thin-channel ultrafiltration system equipped with a 6" diameter Abcor WRP membrane. The ultrafiltration conditions employed were: room temperature, 50 psi, and a pump setting of 6, which provided a flow across the membrane of about 1000 milliliters per minute. After 1400 milliliters of diffusate was collected, water was added periodically until a total of 2300 milliliters of diffusate was collected. The retentate was removed and all fractions assayed as shown below.

|  | Solids | | Protein | |
|---|---|---|---|---|
|  | g/ml | Recovery (%) | % Dry Basis | Recovery (%) |
| CSL Feed | 0.0506 | 100 | 46.6 | 100 |
| Diffusate | 0.0339 | 77.1 | 39.8 | 67.0 |
| Retentate | 0.0425 | 22.9* | 67.8 | 33.0* |
| Overall flux = 19.5 gallons per square foot per day (GFD). | | | | |

*These values were obtained by subtracting the diffusate recovery from 100%.

The above results show that the retentate contained 67.8% protein as compared with 46.6% protein in the CSL feed.

EXAMPLE 2

The procedure of Example 1 was followed using three liters of a different sample of corn steep liquor (CSL) and the ultrafiltration was carried out at a temperature of about 50° C. (bath temperature 60°–65° C.). In this case 2700 milliliters of diffusate was collected (0.9 volume based on CSL feed volume) at an overall flux of 18 gallons per square foot per day (GFD). The protein content of the CSL feed was 44.5%, dry basis, and that of the retentate was 63.9%, dry basis. The solids and protein recoveries were 24.5 and 35.1, respectively. The product was a brown solution with a slightly acid and corn-like flavor.

EXAMPLE 3

Several samples of corn steep liquor (CSL) were obtained from a wet milling corn plant over a period of three months and adjusted with calcium hydroxide to pH 6.0–6.5. After removal of the precipitate by either filtration or centrifugation, solids and protein were determined on both the original CSL feed and filtrate product. The results obtained are shown in Table I. As the data show, the average net gain in protein by treatment of CSL with calcium hydroxide was 4.8%.

TABLE I

| Sample | Original CSL | | CSL after Ca(OH)₂ | | Net Change in Protein (%) |
|---|---|---|---|---|---|
|  | Solids (%) | Protein (% DB) | Solids (%) | Protein (% DB) |  |
| CSL A | 9.87 | 46.2 | 7.12 | 51.4 | +5.2 |
| CSL B | 10.42 | 47.6 | 8.01 | 51.9 | +4.3 |
| CSL C | 4.47 | 47.2 | 3.65 | 52.6 | +5.4 |
| CSL D |  |  |  |  |  |
| 0 hour | 11.52 | 48.9 | 9.05 | 52.5 | +3.6 |
| 4 hours later | 10.41 | 49.3 | 7.64 | 54.8 | +5.5 |
| Average net gain in protein | | | | | +4.8 |

EXAMPLE 4

Three liters of filtered corn steep liquor (CSL) were ultrafiltered as described in Example 1. The retentate was recovered and contained 68.4%, dry basis, protein compared to 48.5%, dry basis, protein in the initial CSL feed.

Twenty-five milliliter aliquots of the retentate at 10.5% solids were adjusted with calcium hydroxide to pH values between 4.5 and 9.0, heated to 80° C. and centrifuged. The clear supernates were decanted and assayed for solids and protein. The results are presented in Table II.

TABLE III

|  | Solids | | Protein | |
|---|---|---|---|---|
| pH | g/ml | Recovery (%) | % DB | Recovery (%) |
| 4.5 | 0.1052 | 100 | 68.4 | 100 |
| 5.5 | 0.0730 | 76.4 | 75.3 | 84.4 |
| 6.0 | 0.0628 | 71.1 | 79.6 | 82.2 |
| 6.5 | 0.0576 | 62.4 | 78.7 | 71.7 |
| 7.0 | 0.0559 | 57.8 | 78.0 | 66.1 |
| 8.0 | 0.0546 | 55.1 | 75.3 | 60.0 |
| 9.0 | 0.0492 | 55.1 | 73.0 | 58.8 |

EXAMPLE 5

This example shows the unexpected increase in protein of the product obtained by the combination of treatments according to this invention.

Corn steep liquor (CSL) obtained from a corn wet milling operation was subjected to ultrafiltration using an Amicon TC-1 ultrafiltration system with 6-inch diameter membranes. The ultrafiltration was carried out at a temperature of about 60°–63° C. under 50 pounds pressure with a pump setting of approximately 5 which provides a flow rate to the membrane of approximately 1000-1200 milliliters per minute. Several membranes were used as shown in Table III.

The retentates obtained from the ultrafiltration step were treated with a 10% aqueous slurry of calcium hydroxide to obtain a pH of about 6.0-6.3 and the precipitate was filtered from the retentates. One milliliter of 15% trichloroacetic acid was added to one milliliter of diffusate to determine if proteins were present in the diffusate.

The data obtained are summarized in Table III:

EXAMPLE 7

On occasion, the protein product after precipitation with calcium hydroxide at relatively low temperatures ($<50°$ C.) develops haze when heated to temperatures greater than 70° C. Haze development can be controlled by heating the precipitated retentate to above 75° C. followed by filtration or centrifugation. The effect of heat treatment on protein content, solids and protein recovery are shown below.

TABLE III

| 1 | 2 | 3 | 4 | 5 | 6 Protein (% Dry Basis) | | | 9 Unexpected | |
|---|---|---|---|---|---|---|---|---|---|
| | | | | | | Retentate after Ca(OH)$_2$[b] | | Protein | Diffusate |
| | | Diffusate | Flux | Original | Retentate after | | | Gain (%) | Reaction |
| Sample[a] | Membrane | Volume | (GFD) | CSL | Ultrafiltration | Found | Anticipated[d] | (7)-(8) | to TCA[c] |
| CSL | Abcor WRP | 0.94 | 14.4 | 47.9 | 65.8 | 76.6 | 70.6 | 6.0 | Negative |
| CSL | Abcor WRP | 1.01 | 8.5 | 47.3 | 69.1 | 82.8 | 73.9 | 8.9 | Negative |
| CSL | Amicon XM-50 | 0.98 | 16.8 | 48.4 | 65.4 | 74.7 | 70.2 | 4.5 | Slightly Positive |
| CSL | Amicon PM-30 | 1.03 | 25.0 | 45.2 | 66.6 | 76.2 | 71.4 | 4.8 | Trace |
| CSL | Amicon PM-30 | 1.27 | 15.9 | 49.2 | 73.4 | 83.5 | 78.2 | 5.3 | Trace |
| CSL | Abcor WRP | 1.22 | 14.3 | 47.2 | 74.7 | 82.9 | 79.5 | 3.4 | Negative |
| CSL | Amicon PM-30, PM-10 | 1.25 | 22.0 | 48.3 | 68.2 | 87.3 | 73.0 | 11.3 | Trace |
| CSL | Abcor HFM | 1.19 | 37.0 | 50.0 | 57.3 | 61.1 | 62.1 | −1.0 | Strong* |

[a]Ultrafiltration conditions: bath temperature 60°-63° C., 50 psi, pump setting 5.5 (approximately 1000-1200 ml/min.). Amicon TC-1 UF system with 6" diameter membranes.
[b]Retentates treated with 10% aqueous slurry of Ca(OH)$_2$ to pH 6.0-6.3 and filtered.
[c]TCA Reaction - one milliliter 15% trichloroacetic acid (TCA) to one milliliter of permeate.
[d]Anticipated value = Protein of retentate after ultrafiltration plus the average net gain in protein obtained by Ca(OH)$_2$ treatment of original CSL (see Table I -- this value is 4.8%).
*The diffusate exhibited a strong response to trichloroacetic acid indicative of the passage of protein which explains the relatively low protein content of the retentate:

In Example 3, the average increase in protein content resulting from the calcium hydroxide treatment of corn steep liquor was found to be 4.8%. In Table III in Column 8, the anticipated protein value is the protein content of the ultrafiltration retentate plus the 4.8% average net gain of protein obtained by calcium hydroxide treatment. The results of Table III show an unexpected gain in protein which is greater than would be expected based on the ultrafiltration and calcium hydroxide precipitation treatments separately.

EXAMPLE 6

Corn steep liquor (CSL) was ultrafiltered as described in Example 2 and the retentate had a protein content of 67.2%, dry basis. Twenty-five milliliter aliquots of the retentate were adjusted to pH 6.0-6.5 with various alkaline materials, heated to 80° C. and centrifuged. The clear supernate was decanted and assayed for protein and solids. These results are shown in Table IV.

| | Solids Recovery (%) | Protein % DB | Protein Recovery (%) |
|---|---|---|---|
| Control Retenate (no Ca(OH)$_2$) | 100 | 70.97 | 100 |
| Calcium Hydroxide at 33° C. | 77.9 | 81.92 | 89.9 |
| Calcium Hydroxide at 76° C. | 75.0 | 80.57 | 85.1 |

Performing the alkaline precipitation at high temperature results in a slightly lower protein content and also in lower solids and protein recovery. However, the product remains haze-free in solution when heated at pH values below 6. This property of heat stability is unexpected because most proteins will precipitate or be denatured at high (100° C.) temperatures.

EXAMPLE 8

Corn steep liquor (CSL) was diluted with water and filtered. Two thousand milliters of the filtrate at pH 4.5 were ultrafiltered through an Abcor WRP membrane. The conditions employed for ultrafiltration were 60° C. bath temperature, 60 psi and a pump setting of 5.5

TABLE IV

| | Solids | Protein | | Net |
|---|---|---|---|---|
| Alkali | Recovery (%) | Content (% DB) | Recovery (%) | Protein Gain (%) |
| None (control) | 100 | 67.2 | 100 | 0 |
| Sodium Hydroxide | 78.7 | 69.5 | 80.0 | +2.3 |
| Sodium Carbonate | 76.8 | 68.5 | 77.2 | +1.3 |
| Ammonium Hydroxide | 80.2 | 79.8 | 93.9 | +12.6 |
| Magnesium Carbonate | 55.1 | 74.2 | 60.0 | +7.0 |
| Aluminum Hydroxide | 68.4 | 70.8 | 71.1 | +3.6 |
| Barium Hydroxide | 59.7 | 81.3 | 71.1 | +14.1 |
| Stannous Chloride* | 67.0 | 71.6 | 70.0 | +4.4 |
| Calcium Hydroxide | 62.4 | 78.7 | 71.7 | +11.5 |

*0.15 g SnCl$_2$ added and adjusted to pH 6.2 with NaOH.

which provided a flow rate of 900–1000 milliliters per minute. After 1520 milliliters of diffusate were collected, ultrafiltration was stopped, the retentate treated with calcium hydroxide and the precipitate filtered. The fractions were assayed with the results shown below. The overall flux was 10.5 GFD.

Ultrafiltration at pH 4.5 v. pH 6.5

| Sample | Solids Recovery (%) | Protein (% DB) | Protein Recovery (%) |
|---|---|---|---|
| CSL Feed | 100 | 47.2 | 100 |
| Diffusate | 50.3 | 40.9 | 43.4 |
| Retentate | 49.7 | 55.9 | 56.6 |
| Retentate after Ca(OH)$_2$ | | | |
| Step Recovery | 78.0 | 62.4 | 86.9 |
| Overall Recovery | 38.8 | | 49.2 |

Two liters of corn steep liquor solution were adjusted to pH 6.5 with calcium hydroixde, a precipitate filtered and the filtrate (2000 milliliters at pH 6.5) was ultrafiltered under the same conditions used above, except at pH 6.5, until 1540 milliliters of diffusate were collected. The overall flux was 10.46 GFD. The diffusate turned slightly hazy on standing. The results from analysis of the fractions are given below.

| Sample | Solids Recovery (%) | Protein (% DB) | Protein Recovery (%) |
|---|---|---|---|
| CSL Feed | 100 | 47.2 | 100 |
| CSL after Ca(OH)$_2$ | 82.4 | 52.6 | 91.9 |
| Diffusate | | 44.4 | |
| Step Recovery | 52.3 | | 44.0 |
| Overall Recovery | 43.1 | | 40.4 |
| Retentate | | 64.7 | |
| Step Recovery | 46.7 | | 55.9 |
| Overall Recovery | 38.5 | | 49.9 |

The results from both pH conditions shows products of comparable protein content were obtained. The overall solids and protein recoveries as well as flux rates were also equivalent. However, the disadvantages of ultrafiltration at high pH conditions are (1) more calcium hydroxide is required for the precipitation, (2) the diffusate tends to be hazy, and (3) high pH favors more rapid microbial contamination. Consequently, it is preferred to conduct the ultrafiltration at low pH, i.e., not above about 5, followed by the precipitation.

EXAMPLE 9

Clarifed corn steep liquor (CSL) was ultrafiltered through an Amicon PM-30 membrane. Diffusate was collected for at least one hour at each temperature and the flux determined. The diffusate was then recombined with the retentate and the process repeated at a different temperature under the same conditions (i.e., 55 psi and pump setting of 5.5). The results are summarized below:

| Temperture of Ultrafiltration (°C.) | Flux (GFD) | Permeate Solids (g/ml) | Permeate Protein (% DB) |
|---|---|---|---|
| 19 | 5.9 | 0.0814 | 36.5 |
| 43 | 10.0 | 0.0869 | 37.3 |
| 55 | 14.6 | 0.0917 | 37.0 |

The data show that flux increases significantly as the temperature increases and high ultrafiltration temperatures, particularly above 55° C., have the added advantages of prevention of microbial growth and less tendency to foul the membrane.

EXAMPLE 10

Samples of corn steep liquor protein produced in accordance with this invention were used as a partial replacement of gelatin in a marshmallow formulation. The marshmallow formula was as follows:

| | (% Wt.) |
|---|---|
| Gelatin (250 Bloom) | 2.0 |
| Sugar | 38.0 |
| Invert Sugar | 15.0 |
| 62 DE Corn Syrup | 30.0 |
| Water | 15.0 |

Corn steep liquor protein (84.0% DB) at a 20% level of replacement of gelatin in the above formula performed very favorably. It whipped equally as well as the gelatin control and the texture and flavor were satisfactory.

The advantages of the present invention are numerous. By means of the invention a desirable protein product can be obtained from corn steep liquor which, because of the large volumes produced, is often considered a waste product. It's principal use is in animal feed formulations and in fermentation media, for which it is sold at a low price. After removal of protein from the corn steep liquor in accordance with the invention, the ultrafiltration diffusate can be used as is corn steep liquor.

The protein product obtained by this invention is soluble in water and acids and can be used advantageously in various applications. Thus, the protein product can be used as a partial replacement of gelatin in candies and because of its solubility in acid it is particularly adapted for use in acidic foodstuffs such as citrus-type beverages. The protein product can likewise be used in coffee whitener formulations, low residue diet formulations, cosmetics such as hair sprays, hair rinses and shampoos, and can be blended with other proteinaceous materials such as soy isolates to improve functionality and nutritional properties.

Those modifications and equivalents which fall within the spirit of the invention are to be considered a part thereof. Thus, for example, the conditions employed in the ultrafiltration can be varied and pressure, temperature and flow rates different from these specifically disclosed can be used, depending upon the design of the ultrafiltration unit and membrane used.

What is claimed is:

1. A process which comprises subjecting corn steep liquor to ultrafiltration to obtain a retentate containing protein, treating the retentate with an alkaline precipitating agent to precipitate non-proteinaceous material in said retentate, and separating the precipitate from said protein-containing retentate.

2. The process of claim 1 wherein after separation of the precipitate the protein-containing retentate is dried.

3. The process of claim 1 wherein the corn steep liquor is filtered prior to being subjected to ultrafiltration.

4. The process of claim 1 wherein the corn steep liquor which is subjected to ultrafiltration has a pH value of not substantially above 5.

5. The process of claim 1 wherein prior to separation of the precipitate, the protein-containing retentate is heated to a temperature above about 75° C.

6. The process of claim 1 wherein the alkaline precipitating agent is calcium hydroxide.

* * * * *